United States Patent [19]

Healey et al.

[11] 4,021,655

[45] May 3, 1977

[54] OVERSIZED DATA DETECTION HARDWARE FOR DATA PROCESSORS WHICH STORE DATA AT VARIABLE LENGTH DESTINATIONS

[75] Inventors: Robert Albert Healey, Endicott; Thomas Leo Jeremiah, Conklin, both of N.Y.

[73] Assignee: International Business Machines Corporation, Armonk, N.Y.

[22] Filed: Mar. 30, 1976

[21] Appl. No.: 671,857

[52] U.S. Cl. .............................. 235/156; 340/172.5
[51] Int. Cl.² ....................................... G06F 13/00
[58] Field of Search .......... 235/156, 159, 160, 164; 340/172.5

[56] References Cited

UNITED STATES PATENTS

| | | | |
|---|---|---|---|
| 3,454,750 | 7/1969 | Shimabukuro | 235/159 |
| 3,539,790 | 11/1970 | Shimabukuro | 235/159 |
| 3,569,685 | 3/1971 | Chesley | 235/156 |
| 3,739,352 | 6/1973 | Packard | 340/172.5 |
| 3,751,650 | 8/1973 | Koehn | 235/175 |

*Primary Examiner*—David H. Malzahn
*Attorney, Agent, or Firm*—Richard E. Bee

[57] ABSTRACT

Size exception detection hardware for use with a digital data processor arithmetic unit for providing highspeed detection of lost data which results from storing an arithmetic result in a destination which is smaller than one or both of the source operands. In response to data processing machine instructions, the arithmetic unit performs arithmetic operations on variable length operands and sends the arithmetic results to variable length destinations. The operand and destination lengths are specified by length fields in the machine instruction. The destination length is specified independently of at least one of the operand lengths and hence may be less than such operand length. The size exception detection hardware looks at both the output field of the arithmetic unit and the destination length field in the machine instruction and generates a size exception program interrupt signal when the part of the arithmetic unit output field located outside of the destination length contains significant data. The size exception interrupt is generated during the same machine control cycle during which the arithmetic unit performs the arithmetic operation which gives rise to the size exception.

12 Claims, 13 Drawing Figures

| DECIMAL | HEX | BINARY |
|---|---|---|
| 0 | 0 | 0 0 0 0 |
| 1 | 1 | 0 0 0 1 |
| 2 | 2 | 0 0 1 0 |
| 3 | 3 | 0 0 1 1 |
| 4 | 4 | 0 1 0 0 |
| 5 | 5 | 0 1 0 1 |
| 6 | 6 | 0 1 1 0 |
| 7 | 7 | 0 1 1 1 |
| 8 | 8 | 1 0 0 0 |
| 9 | 9 | 1 0 0 1 |
| 10 | A | 1 0 1 0 |
| 11 | B | 1 0 1 1 |
| 12 | C | 1 1 0 0 |
| 13 | D | 1 1 0 1 |
| 14 | E | 1 1 1 0 |
| 15 | F | 1 1 1 1 |

FIG. 5

| DESTINATION LENGTH BITS | | | | DEST LENGTH (BYTES) | BYTES SELECTED | | | | | | | |
|---|---|---|---|---|---|---|---|---|---|---|---|---|
| 0 | 1 | 2 | 3 | | 0 | 1 | 2 | 3 | 4 | 5 | 6 | 7 |
| 0 | 0 | 0 | 0 | 1 | X | X | X | X | X | X | X | |
| 0 | 0 | 0 | 1 | 2 | X | X | X | X | X | X | | |
| 0 | 0 | 1 | 0 | 3 | X | X | X | X | X | | | |
| 0 | 0 | 1 | 1 | 4 | X | X | X | X | | | | |
| 0 | 1 | 0 | 0 | 5 | X | X | X | | | | | |
| 0 | 1 | 0 | 1 | 6 | X | X | | | | | | |
| 0 | 1 | 1 | 0 | 7 | X | | | | | | | |
| 0 | 1 | 1 | 1 | 8 | | | | | | | | |
| 1 | 0 | 0 | 0 | 9 | X | X | X | X | X | X | X | |
| 1 | 0 | 0 | 1 | 10 | X | X | X | X | X | X | | |
| 1 | 0 | 1 | 0 | 11 | X | X | X | X | X | | | |
| 1 | 0 | 1 | 1 | 12 | X | X | X | X | | | | |
| 1 | 1 | 0 | 0 | 13 | X | X | X | | | | | |
| 1 | 1 | 0 | 1 | 14 | X | X | | | | | | |
| 1 | 1 | 1 | 0 | 15 | X | | | | | | | |
| 1 | 1 | 1 | 1 | 16 | | | | | | | | |

OVERSIZED DATA DETECTION HARDWARE FOR DATA PROCESSORS WHICH STORE DATA AT VARIABLE LENGTH DESTINATIONS

CROSS-REFERENCE TO RELATED APPLICATION

The representative embodiment of the invention described in the present application is specifically tailored for use with an arithmetic unit of the kind described in copending United States patent application Ser. No. 587,797, filed June 17, 1975, and entitled "Arithmetic Unit for a Digital Data Processor". Such arithmetic unit is of the multibyte parallel type and is capable of performing arithmetic operations on decimal operands in zoned format, decimal operands in packed format and signed binary operands. The description set forth in this copending application is hereby incorporated in the present application by this reference thereto.

BACKGROUND OF THE INVENTION

This invention relates to program interrupt mechanisms for use in digital computers and digital data processors for generating interrupt signals upon occurrence of unusual or undesirable conditions during the execution of a computer program. This invention is particularly useful for generating a program interrupt when the computer or processor attempts to store data at a destination having a length which is less than the length of the data.

The various System/360 and System/370 computers or data processors manufactured and marketed by International Business Machines Corporation of Armonk, N.Y. (herein referred to as "IBM"), are capable of performing so-called "decimal" instructions. Among other things, these instructions enable the adding, subtracting, multiplying and dividing of numbers in a binary coded decimal format as opposed to a binary format. The machine instruction format for these decimal instructions specifies that each such machine instruction shall include an operation code, first operand starting address information, second operand starting address information, a first operand length value and a second operand length value. The length values indicate the number of bytes in the respective operands. In the execution of the decimal ADD instruction, for example, the second operand is added to the first operand and the result is placed in the first operand location. Thus, the first operand length value also represents the length of the destination at which the result is to be stored. This same consideration applies to the other decimal instructions, that is, the results of existing System/360 and System/370 decimal operations are always stored in the first operand field location.

A problem can occur and data can be lost when the length of the second operand field is greater than the length of the first operand/destination field. The field sizes alone, however, do not tell whether or not significant result digits will be lost. For example, the second operand field may be larger, but the higher order digit positions therein may only contain nonsignificant zeros. Another example is the case of subtraction. The second operand may be larger, but the subtraction process may produce a result which is not larger than the destination field length.

Various mechanisms are employed in the different System/360 and System/370 processors for producing a program interrupt for those cases where significant digits are lost because of the occurrence of an oversized decimal result. The exact nature of these mechanisms varies from one machine to the next and is dependent on the nature of the hardware circuitry in the machine. In microprogram controlled machines, this mechanism generally takes the form of a microcode routine which performs a series of microcode steps to check for the loss of significant digits.

The existing oversized result detection mechanism which appears to be most pertinent to the present invention is the one used in the IBM System/360 Model 50 processor. This Model 50 machine is described in considerable detail in the following published and copyrighted IBM Field Engineering Theory of Operation Manuals: (1) "System/360 Model 50 Comprehensive Introduction", IBM Order Number SY22-2821 (Fourth Edition copyrighted 1966); (2) "System/360 Model 50 Functional Units", IBM Order Number SY22-2822 (Fifth Edition copyrighted 1965); (3) "System/360 Model 50 RR, RX Instructions, Interruptions/Exceptions", IBM Order Number SY22-2824 (Fifth Edition dated July 1968); (4) "System/360 Model 50 RS, SI, SS Instructions", IBM Order Number SY22-2825 (Sixth Edition copyrighted 1966); and (5) "System/360 Model 50 Main Storage, Local Storage, Storage Protection", IBM Order Number SY22-2828 (Fifth Edition dated May 1969). Copies of these manuals may be obtained through any IBM Branch Office. The oversized result detection mechanism appears to be best described at pages 55, 56 and 68–82 of the above-indicated item (4) manual.

The IBM System/360 Model 50 Machine is a microprogrammed data processor wherein the primary data buses and the arithmetic unit have a width of four bytes (32 data bits). Thus, during a given machine control cycle, the arithmetic unit can receive two 32-bit data fields and produce a 32-bit result field. In the execution of a decimal ADD instruction, for example, the general procedure is to fetch the first four bytes of each operand, add them together and store the four-byte result at the corresponding four-byte location of the first operand, and then to repeat these steps for the remaining four-byte portions of the operands until the first operand field is exhausted. Initially, the first and second operand length values are set into two individual length counters. These counters are decremented each time operand portions are passed through the arithmetic unit to reflect the number of bytes processed during that pass. The passing of data portions through the arithmetic unit continues until the first operand counter indicates that the first operand length has been exhausted. The processor then checks the second operand length counter to see if the second operand field is also exhausted. If it is, the processor proceeds to the normal instruction ending routine. If, on the other hand, the second operand length counter has not reached zero, then the remainder of the second operand field must be examined to see if it contains any significant digits. If it does, a decimal overflow interrupt is generated.

The checking of the second operand length counter and the testing of the leftover second operand digit positions for significant data requires additional machine control or microinstruction cycles.

SUMMARY OF THE INVENTION

It is an object of the invention, therefore, to provide a new and improved oversized data detection mechanism for variable length operands for eliminating the need for using additional machine control cycles to determine whether any data has been lost.

It is another object of the invention to provide a new and improved oversized data detection mechanism for variable length operands which is faster acting and which is capable of generating a size exception indication during the same machine control cycle during which the arithmetic unit performs the arithmetic operation which gives rise to the size exception.

It is a further object of the invention to provide a new and improved oversized data detection mechanism which is particularly useful in high-speed data processors having parallel type arithmetic units of relatively wide width.

It is an additional object of the invention to provide a new and improved oversized data detection mechanism which is particularly useful in data processors having arithmetic units which are capable of processing data having different kinds of data formats.

In accordance with the invention, in a data processing system capable of storing variable length operands in variable length destinations, there is provided hardware circuitry which is directly and immediately responsive to the data field to be stored for immediately generating a size exception indication when the part of the data field located outside of the destination length contains significant data. This hardware circuitry includes circuitry responsive to the destination length field in the machine instruction for determining the part of the data field which is located outside of the destination length and circuitry for testing this point of the data field for the presence of significant data.

For a better understanding of the present invention, together with other and further objects and features hereof, reference is made to the following description taken in connection with the accompanying drawings, the scope of the invention being pointed out in the appended claims.

BRIEF DESCRIPTION OF THE DRAWINGS

Referring to the drawings.

DESCRIPTION OF THE PREFERRED EMBODIMENT

Figure 1:
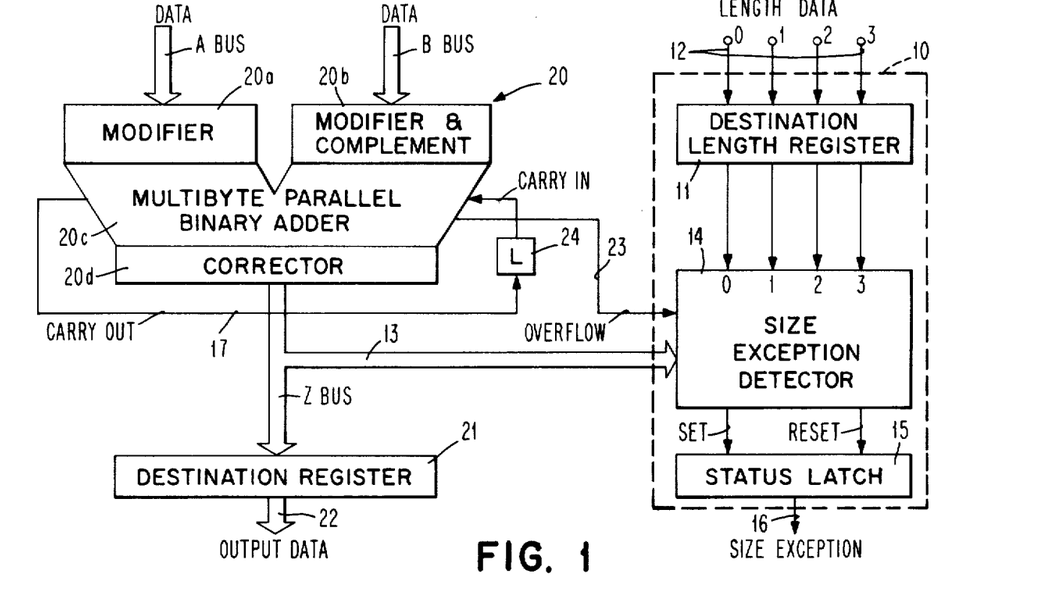
FIG. 1 is a functional block diagram showing oversized data detection hardware constructed in accordance with the present invention and its manner of use with a data processor arithmetic unit.

Referring to FIG. 1 of the drawings, there is shown oversized data detection hardware 10 constructed in accordance with a representative embodiment of the present invention. This hardware 10 is intended for use in a digital data processing system capable of storing variable length operands at variable length destinations and wherein the destination length may be less than the length of the operand to be stored. The hardware 10 includes circuitry for providing an indication of the destination length. This circuitry includes a destination length register 11 which receives by way of input lines 12 length bits corresponding to the length bits in the destination length field in the machine instruction. The hardware circuitry 10 also includes circuitry responsive to the operand to be stored for providing status signals for different parts of the operand field. This circuitry includes a multiconductor data bus 13 for supplying to the hardware 10 bit level status indications for each of the bit positions in the data field being monitored.

The hardware 10 further includes circuitry responsive to the destination length indication in the register 11 and to the bit level status signals on the data bus 13 for generating a size exception indication when the part of the data field located outside of the destination length contains significant data. At the FIG. 1 level, this circuitry includes a size exception detector 14 and a 1-bit binary status latch 15. The size exception detector 14 responds to the length bits supplied by the destination length register 11 and to the operand data bits supplied by the bus 13 to produce set and reset signals for the status latch 15. A set signal sets the status latch 15 to indicate the occurrence of a size exception. The resulting binary 1 level on the latch output line 16 represents the occurrence of a size exception. A reset signal, on the other hand, resets the status latch 15 to indicate the absence of a size exception. The resulting binary 0 level on the latch output line 16 represents the absence of a size exception.

If the hardware 10 is used in a System/360 or System/370 type machine and if the output line 16 is properly connected to the remainder of the processor, the occurrence of a size exception indicating binary one level on output line 16 will cause a program interrupt, unless the processor is programmed to ignore it by the zero setting of the appropriate program mask bit in the program status word register. If the mask bit is on, the size exception is honored and a program interrupt is produced. This causes the data processor to interrupt the running program and to branch to the appropriate interrupt handling routine.

FIG. 1 further shows the use of the oversized data detection hardware 10 in connection with a data processor arithmetic unit 20. Arithmetic unit 20 is a multibyte parallel type arithmetic unit of the kind described in the above cross-referenced copending application Ser. No. 587,797. For sake of example herein, the arithmetic unit 20 is assumed to have a width of 8 bytes (64 bits). As such, it is capable of receiving in a parallel manner eight bytes of data on a first input bus A, 8 bytes of data on a second input bus B, performing an arithmetic operation with these two sets of input data and producing in a parallel manner 8 bytes of result data on its output bus Z.

The arithmetic unit 20 is capable of performing addition and subtraction operations on any of the following forms of data; (1) binary coded decimal data in a zoned format; (2) binary coded decimal data in a packed format; and (3) data in a signed and pure binary format. To this end, it includes a first input modifier section 20a, a second input modifier and true/complement section 20b, a multibyte parallel binary adder section 20c and an output corrector section 20d. When working with data in pure binary form, the modifying and correcting actions in sections 20a, 20b and 20d are disabled and the unit 20 functions in the manner of an ordinary binary adder with a true/complement section on the B side input for enabling complement subtraction when desired.

When working with binary coded decimal data, an excess six type of arithmetic is used. This is accomplished by means of the B side input modifier 20b and the output corrector 20d. The input modifier 20b is effective, when adding, to increase each digit by a factor of 6 and the output corrector 20d is effective, for both addition and subtraction, to subtract a factor of 6 from certain ones of the result digits. This adding and subtracting of sixes is needed to take into account the difference between the decimal (base 10) and the hexadecimal (base 16) number systems. Both the A side input modifier 20a and the B side input modifier 20b are effective when operating with zoned decimal data for forcing the zone field portions in the two sets of input data to the proper values for enabling the proper propagation of digit carries across the zone fields inside the adder section 20c. The output corrector 20d thereafter causes the zone fields in the result to have the proper zone code value.

The result data on the Z bus is set into an 8-byte destination register 21 from whence it is sent to the desired destination by way of an 8-byte data bus 22. In a System/360 or System/370 type machine, the destination will normally be the main storage unit (not shown) in the data processor. In this regard, it should be carefully noted that the destination register 21 is not the data destination being referred to herein. It is only a temporary holding register for holding the data preparatory to sending it to the desired destination.

The adder section 20c includes a carry-out line 17 for supplying any carry-out from the highest order bit position in the adder section 20c to a 1 bit latch circuit 24. This latch circuit 24 is used to provide a carry-in signal to the lowest order bit position in the adder section 20c when making a second pass with the higher order parts of operands having lengths greater than the width of the arithmetic unit 20. The adder section 20c also includes an overflow line 23 used to provide an overflow signal for the size exception detector 14.

The input bus 13 running to the size exception detector 14 has a width of 8 bytes and supplies to such detector 14 in a parallel manner all 64 of the result bits appearing on the arithmetic unit output bus Z.

Figure 2:
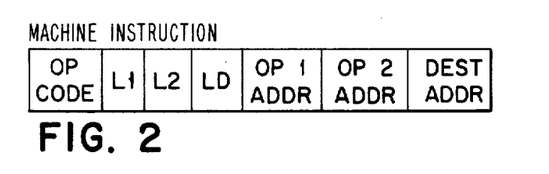
FIGS. 2 and 3 show different forms of machine instruction format that may be used with the present invention.
Figure 3:
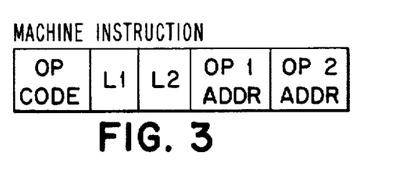

FIGS. 2 and 3 show two different types of machine instructions that may be employed for enabling data processors to perform variable length operations. FIG. 2 shows a three-operand type of instruction with the destination being considered as the third operand. L1 is the length field for the first operand and the coding of the binary bits therein specifies the length of the first operand. In a similar manner, L2 is the length field for the second operand and LD is the length field specifying the length of the destination. The address fields contain information from which the storage starting addresses for the operands and destination can be determined. In a byte-oriented processor, each byte location in storage has its own unique address. The address field specifies the address of the first byte in the operand and the length field specifies the length of the operand in byte units or number of bytes. With these two pieces of information, namely, the starting byte address and the length in bytes, the storage locations for the operand in question are completely defined.

FIG. 3 shows the case of a two-operand machine instruction. This is the instruction format used in the IBM System/360 and System/370 machines for decimal instructions. In this case, the destination starting address is defined as being the same as the first operand starting address and the destination length is defined as being the same as the first operand length L1. In other words, the results of decimal operations are stored in the first operand storage locations. The problem of lost data caused by the occurrence of an oversized result can nevertheless still occur because the second operand length L2 is independently specified and may be greater than the destination length L1.

With reference to FIG. 1, it can be seen that, for purposes of the present invention, it is immaterial whether the machine instruction is of the FIG. 2 type or of the FIG. 3 type. In either case, the proper length field is selected and set into the destination length register 11. In the FIG. 2 case, the LD length field would be selected and set into the register 11, while in the FIG. 3 case, the L1 field would be selected and set into the register 11.

For sake of an example, it is assumed herein that each length field in the machine instruction has 4 bit positions. Thus, each length value can vary over the range of 1 through 16. It is further assumed that the length value represents the number of byte units or bytes for the operand or destination in question. Also, with respect to the numbering shown in FIG. 1 and elsewhere herein, length bit zero is assumed to be the most significant length bit and length bit three is assumed to be the least significant length bit. Also, the length bits are encoded in accordance with the 8-4-2-1 code system, with the length value being understood to be one greater than the actual 8-4-2-1 value. In other words, 0000 represents a length value of 1 byte.

Figure 4:
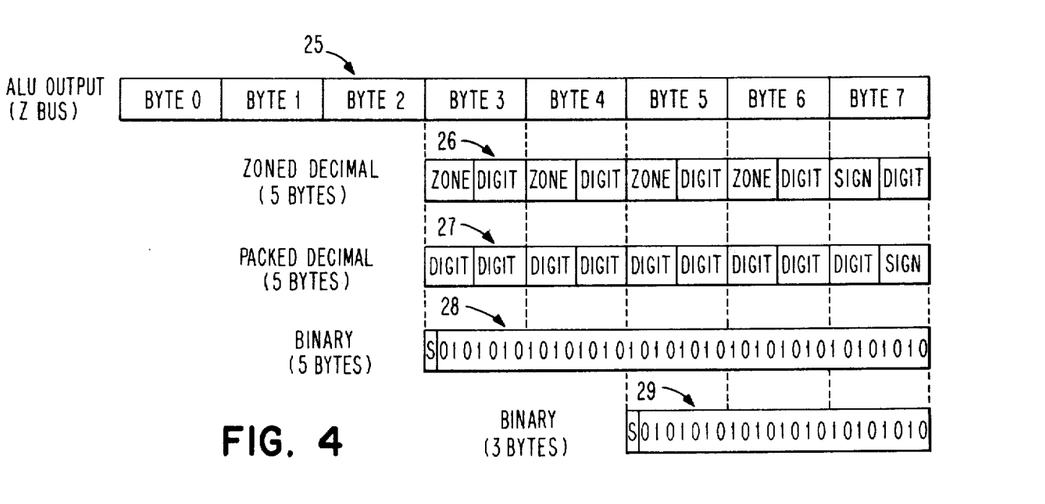
FIG. 4 is a data format diagram used in explaining the operation of the FIG. 1 embodiment.

FIG. 4 shows the nomenclature that will be used herein for describing the result data coming out of the arithmetic unit 20. This nomenclature is indicated at 25 in FIG. 4 and, as there indicated, the 8 byte groups of conductors forming the Z bus are numbered from left to right as Byte 0 through Byte 7. The order of significance, however, increases in the opposite direction, namely, from right to left. Thus, Byte 7 is the least significant byte and Byte 0 is the most significant byte. Each byte group of conductors includes eight individual bit conductors or bit lines. Within each byte, these are numbered from left to right as Bit 0 through Bit 7. As before, the order of significance increases in the opposite direction. Thus, Bit 7 is the least significant bit and Bit 0 is the most significant bit.

Figure 5:
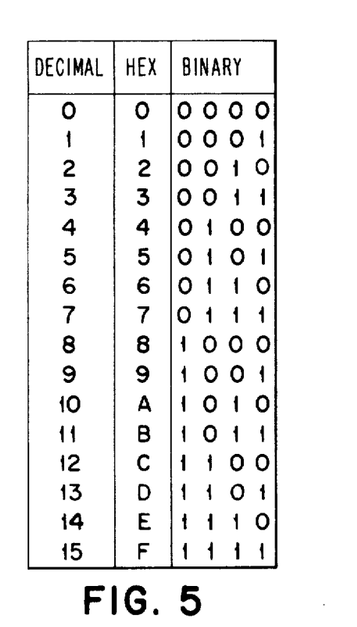
FIG. 5 is a chart used to show the relationship between decimal, hexadecimal and binary numbers.

FIG. 4 also shows examples of data in different data formats as it appears at the output of the arithmetic unit 20. The data shown at 26 is in zoned decimal format and the data shown at 27 is in packed decimal format. Each digit field, each zone field and each sign field has a width of four bits. The coding used for the digit fields is represented by the first 10 entries (0–9) in the chart of FIG. 5. The System/360 and System/370 zone field code for numerical data is 1111 (hexadecimal F). The sign fields use different ones of the 1010 through 1111 code values (hexadecimal A through F) to represent positive and negative signs. As a convenient form of shorthand, the contents of a byte are sometimes described using hexadecimal notation. Thus, a byte value of FF denotes that each of the two 4-bit fields in the byte has a binary value of 1111.

The data examples shown at 28 and 29 in FIG. 4 are in signed binary format. Example 28 shows the case of a 5-byte result operand and example 29 shows the case of a 3-byte result operand. In each case, the highest order bit is a sign bit S. A sign bit value of 0 represents a positive sign and a sign bit value of 1 represents a negative sign. For sake of simplicity, hexadecimal notation is also sometimes used to describe binary data. Thus, example 29 can be represented as XAAAAA. The X denotes that the value for the highest order 4-bit group is dependent on the value of the sign code bit S.

As indicated in FIG. 4, it is assumed herein that all data is right justified.

Referring to FIG. 1, it is helpful to review the assumptions regarding the width of the arithmetic unit 20 and the range of variation for the operand lengths. The arithmetic unit 20 has a width of 8 bytes. The operands can vary in length from one byte up to and including 16 bytes. If both source operands have a length of 8 bytes or less, then such operands can be processed on a single pass through the arithmetic unit 20. If, on the other hand, one or both of the source operands has a length greater than 8 bytes, a second pass through the arithmetic unit 20 is required in order to process the higher order portion of such operand or operands. Thus, the size exception detector 14 is also required to take into account whether the arithmetic unit 20 is performing a first pass operation or a second pass operation for a given set of input or source operands.

Figure 6:
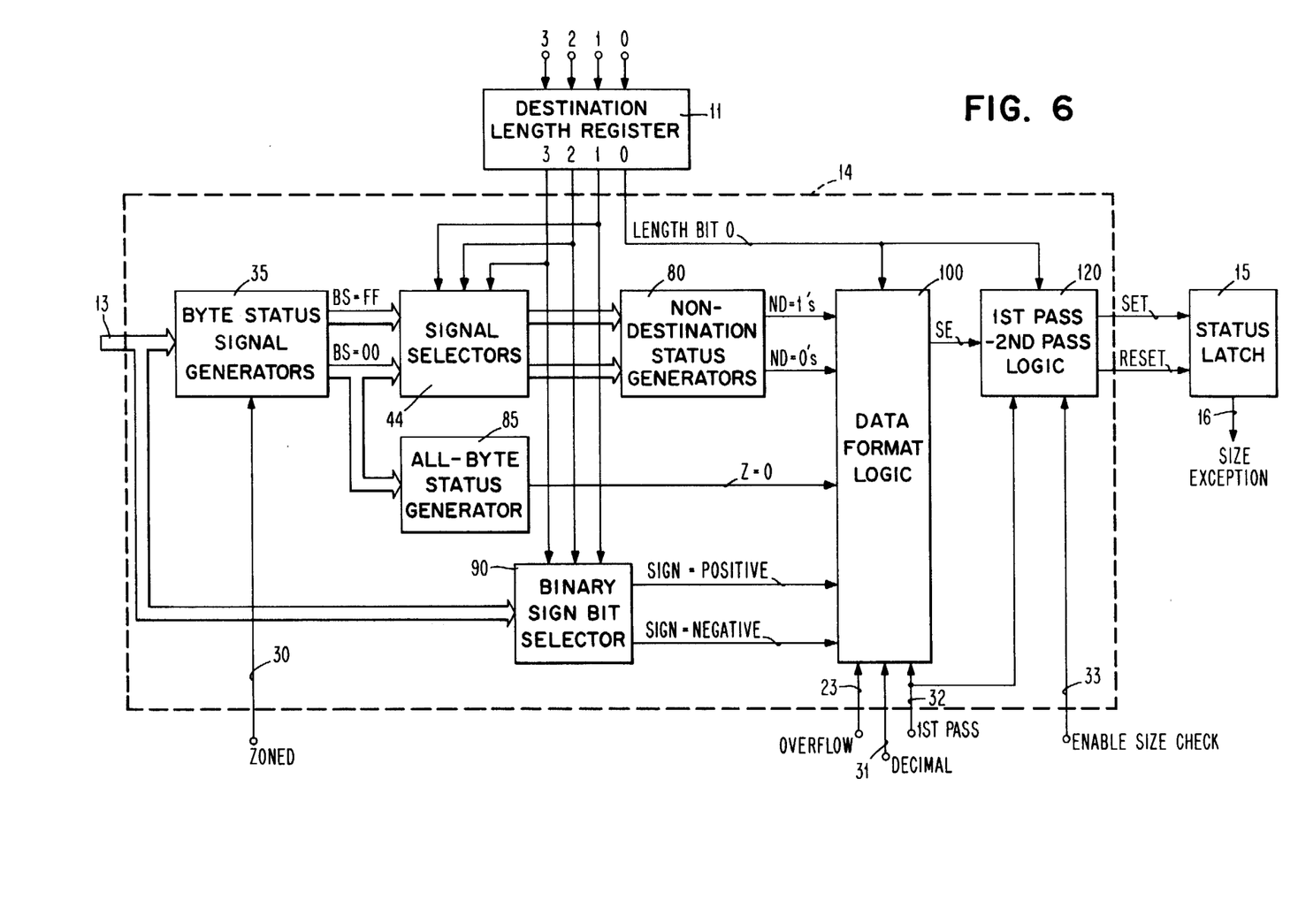
FIG. 6 is a functional block diagram showing in greater detail the construction of a representative embodiment for the size exception detector of FIG. 1.

Referring now to FIG. 6, there is shown a representative form of internal construction for the size exception detector 14 of FIG. 1. In addition to the inputs already considered, the size exception detector 14 also receives various control signals from the control section of the data processor. These include a zoned format control signal received on a control line 30, a decimal control signal received on a control line 31, a first pass control signal received on a control line 32 and an Enable Size Check control signal received on a control line 33. The zoned signal on line 30 is at the binary 1 level when the arithmetic unit 20 is processing data in zoned decimal format. The decimal signal on line 31 is at the binary one level when the arithmetic unit 20 is processing data in either zoned decimal or packed decimal format. The signal on line 31 is at the binary 0 level when binary data is being processed. The first pass signal on line 32 is at the binary one level when the arithmetic unit 20 is performing a first pass operation and is at the binary 0 level when the arithmetic unit 20 is performing a second pass operation. The Enable Size Check signal on line 33 controls the transfer of the set and reset signals to the status latch 15. A binary 1 level on line 33 enables the transfer of set and reset signals to the status latch 15 and the binary 0 level disables such transfer. Among other things, the zero level on line 33 is used to disable the set/reset transfer when the arithmetic unit 20 is doing something other than an arithmetic operation.

Figure 7:
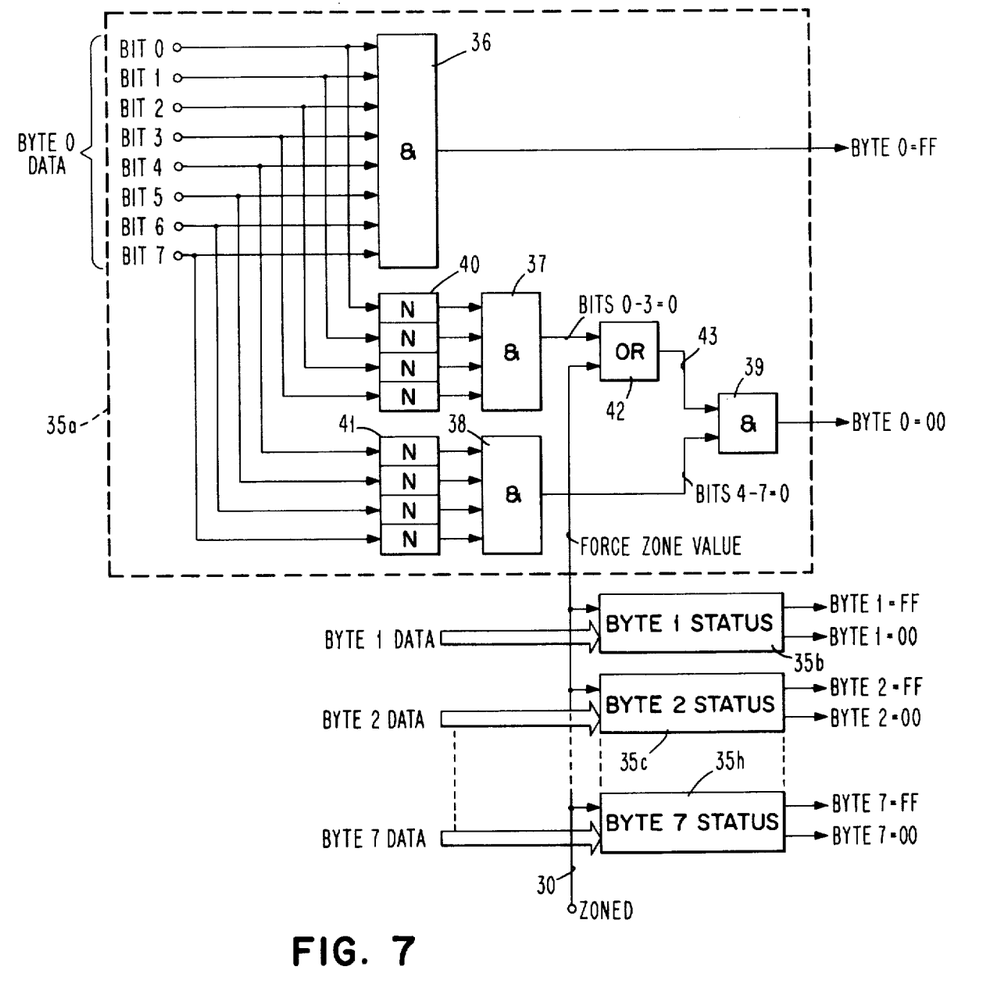
FIG. 7 is a logic circuit diagram showing a representative form of internal construction for the byte status signal generators of FIG. 6.

The bit level status signals on detector input bus 13 are supplied to byte status signal generators 35 for producing byte level status signals for the different bytes of the output field of arithmetic unit 20. A representative form of construction for these byte status signal generators 35 is shown in FIG. 7. With reference to FIG. 7, there are eight such byte status signal generators, there being one for each byte in the arithmetic unit output field. These byte level status generators are designated by reference numerals 35a–35h with generators 35d–35g being omitted from the drawing for simplicity of illustration. Also, only the first generator 35a is shown in detail, the remainder of the generators being represented in block fashion.

As indicated in FIG. 7, each of the status signal generators 35a–35h produces two output byte status signals. One of these is a one indicating FF status signal. This signal is at the binary one level if all 8 bits in the byte are at the binary 1 level. The second status signal is a zero indicating 00 status signal. This 00 status signal is at the binary 1 level if all eight bits in the byte are at the binary 0 level.

The manner of generating these FF and 00 status signals is indicated by the detailed showing for the Byte 0 generator 35a. In particular, AND circuit 36 produces the one level FF signal if all 8 bits of Byte 0 are at the binary 1 level. AND circuits 37, 38 and 39 produce the one level 00 signal if all 8 bits of Byte 0 are at the zero level. The necessary inverting action is provided by NOT circuits 40 and 41.

The circuitry for producing the 00 signal is split into two parts, corresponding to the two 4-bit digit fields in the byte, to give the proper results when the arithmetic unit 20 is processing data in the zoned decimal format. When processing such zoned decimal data, the zone field portion of the byte will always have a 1111 value, provided that such byte falls within one of the operand lengths. Thus, it would be impossible to obtain the 0000 condition for Bits 0–3 when processing zoned decimal data. This difficulty is overcome by using an OR circuit 42 and supplying to the second input thereof the zoned format control signal on control line 30. The binary one level on control line 30 forces the status signal for the 4-bit zone field portion (the status signal on line 43) to assume the binary one level when processing zoned decimal data. This forced one level represents the 0000 condition for the zone field bits, namely, Bits 0–3.

A similar zone field forcing mechanism is used in each of the other byte status generators 35b–35h. This forcing mechanism, in effect, disables the checking action for the zone fields. This is perfectly proper since the zone fields do not contain significant data.

As indicated in FIG. 6, the various FF and 00 byte status (BS) signals produced by byte status generators 35a–35h are supplied to signal selectors 44. Signal selectors 44 operate to select for further consideration the byte status signals for that part of the arithmetic unit output field which is located outside of the destination length. A representative form of construction for the signal selectors 44 is shown in FIG. 8.

Figure 8:
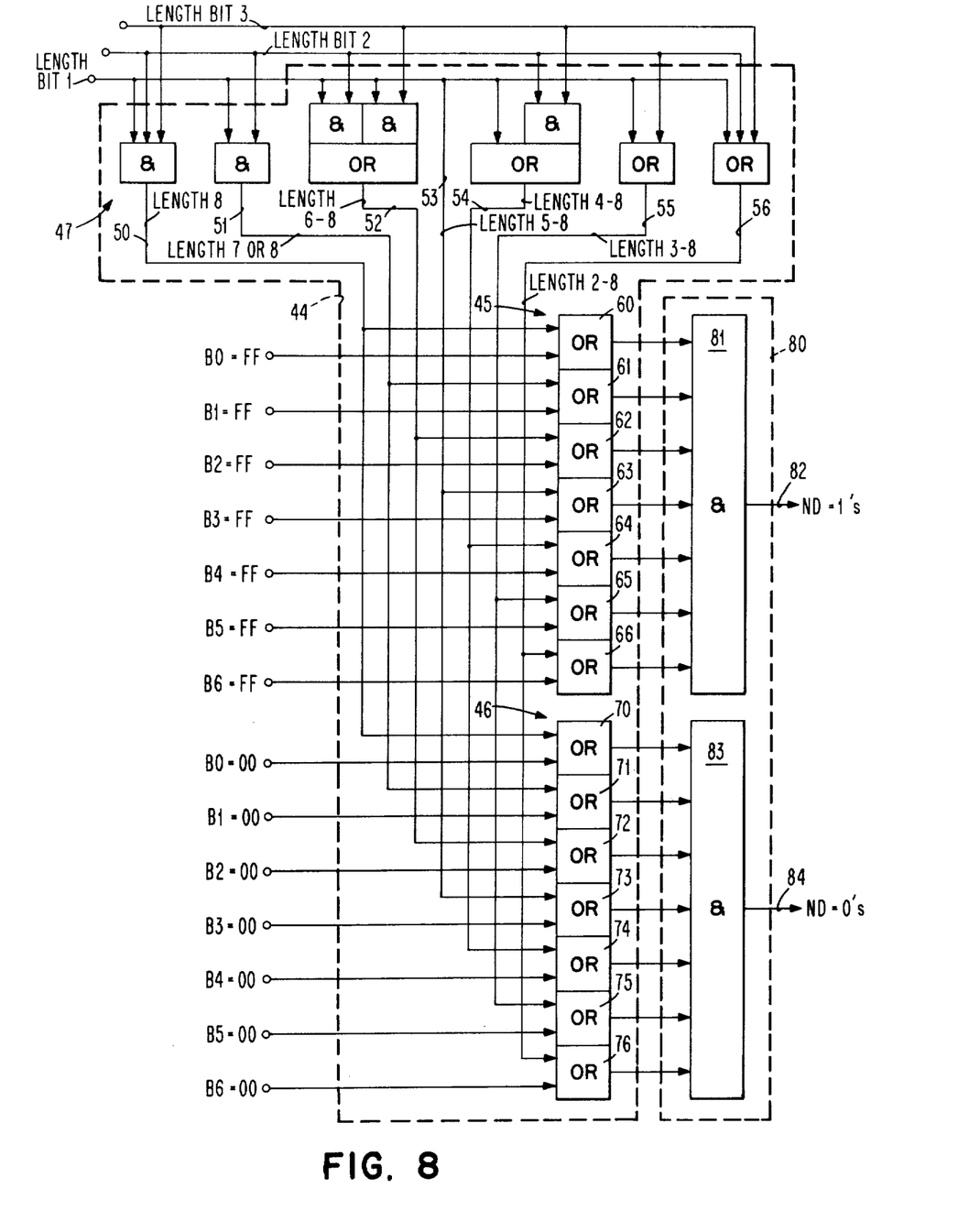
FIG. 8 is a logic circuit diagram showing a representative form of internal construction for the signal selectors and nondestination status generators of FIG. 6.

With reference to FIG. 8, there are essentially two sets of signal selectors, one for the FF signals and the other for the 00 signals. The FF set is represented by OR circuits 45 and the 00 set is represented by OR circuits 46. Both sets operate in step with one another so that if the FF signal for a given byte is selected, so is the 00 signal for this same byte. The selection action is controlled by the lower order three length bits, namely, length bits 1, 2 and 3 obtained from the destination length register 11. These length bits are supplied to a form of decoder logic represented by the AND and OR circuits shown at the top of FIG. 8 and identified as a group by reference numeral 47.

Figure 9:
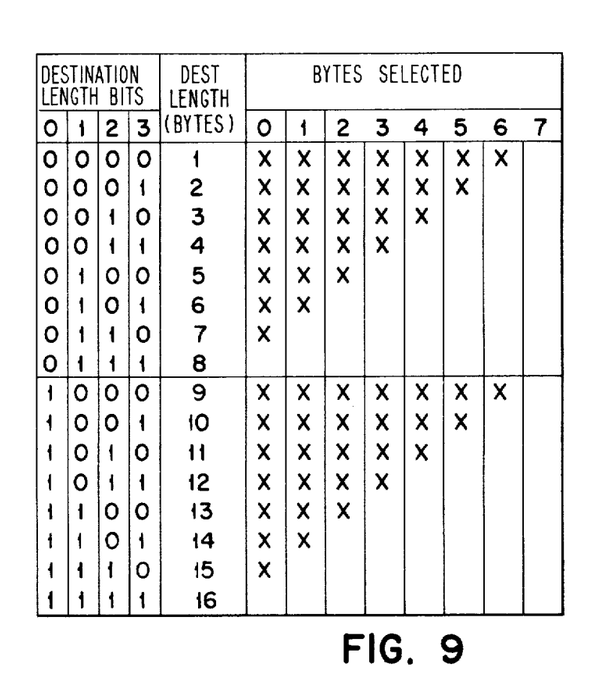
FIG. 9 is a chart used in explaining the operation of the signal selector portion of FIG. 8.

The selecting action is best explained with the aid of the chart shown in FIG. 9. This chart shows all of the sixteen possible permutations for the four destination length bits and the corresponding destination length value in bytes for each such permutation. It is noted that the most significant length bit, namely, length bit 0, is at the binary 0 level if the destination length is not greater than eight bytes and is at the binary 1 level if the destination length is greater than 8 bytes. This correlates with the 8-byte width of the arithmetic unit 20 and enables a simplification of the selection circuitry in that this length bit 0 need not be taken into account by the selection circuitry. It will, however, be taken into account at a later point in the size exception detector 14.

The X symbols in the "Byte Selected" columns of the FIG. 9 chart denote the bytes which are located outside of the destination length. These then are the bytes whose FF and 00 status signals need to be examined for the presence of significant data. Thus, for example, if the destination length is five, then, as indicated by examples 26–28 of FIG. 4, it is Bytes 0, 1 and 2 which need to be examined to make sure that no significant data is lost.

With reference to FIG. 8, the output control lines from the decoder logic 47 are identified by reference numerals 50–56. Decoder line 50 controls the OR circuits 60 and 70 for the Byte 0 status signals FF and 00. Decoder output line 51 controls the OR circuits 61 and 71 for Byte 1. This same numbering system is used for the remainder of the decoder output line and OR circuit groupings. Thus, the decoder output line 56 controls the OR circuits 66 and 76 for Byte 6. It is noted in passing that Byte 7 is not present in the selector unit 44. This is because the destination length must always be at least one byte. Hence, there is no need to worry about Byte 7 data not having a place to be stored.

The selector unit 44 uses an inverted form of selecting action. In effect, a binary 0 level on any one of the decoder output lines 50–56 will enable its corresponding OR circuits, while a binary one level will disable its corresponding OR circuits. For example, if the decoder output line 50 is at the disabling one level, then the outputs of OR circuits 60 and 70 are locked at the one level and cannot respond to the Byte 0 FF and 00 status signals. The proper technique, then, is to set to the disabling level (one level) the decoder output lines for those bytes which fall within the destination length and to set to the enabling level (zero level) the decoder output lines for those bytes that fall outside of the destination length. This is exactly what is done by the decoder logic 47.

Considering, for example, the previously considered example of a destination length value of five (length code 100 on length bit lines 1, 2 and 3), the decoder logic 47 sets the decoder output lines 53–56 for Bytes 3 through 6 at the disable level (one level) and sets the decoder output lines 50–52 for Bytes 0, 1 and 2 at the enable level (zero level). Thus, only Bytes 0, 1 and 2 are checked for lost data.

The outputs of OR circuits 60–66 and 70–76 are connected to the inputs of nondestination status generators 80 which are also shown in FIG. 8. In particular, the FF status lines from OR circuits 60–66 are connected to a first AND circuit 81. Thus, a binary one level at the output of AND circuit 81 denotes that all nondestination (ND) bits, that is, all arithmetic unit output field bits located outside of the destination length are at the binary 1 level. The one level output of AND circuit 81 thus constitutes a one indicating status signal for the entire nondestination field portion of the arithmetic unit output.

Considering the same example of a length value of 5, the outputs of OR circuits 63–65 will be locked at the binary 1 level by the one levels on the decoder output control lines 53–56. Thus, only the OR circuits 60–62 for Bytes 0–2 can affect the signal level at the output of AND circuit 81. Thus, only Bytes 0–2 enter into a determination of the nondestination (ND) signal value on output line 82.

A second AND circuit 83 performs a corresponding function for the 00 byte status signals. The output line 84 of AND circuit 83 will assume the binary 1 level if all of the arithmetic unit output bits located outside of the destination length are at the binary 0 level. The one level output of AND circuit 83 thus constitutes a zero indicating status signal for the entire nondestination field portion of the arithmetic unit output.

Figure 10:
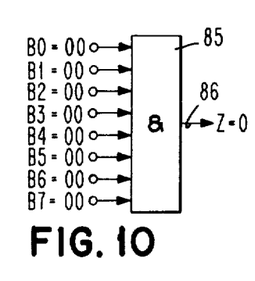
FIG. 10 is a logic circuit diagram showing a representative form of construction for the all-byte status generator of FIG. 6.

Referring now to FIG. 10, there is shown a representative form of construction for an all-byte status generator 85 of FIG. 6. As indicated in FIG. 10, this all-byte status generator 85 takes the form of an AND circuit which receives all eight of the 00 byte level status signals from the byte status signal generators 35. The output of the AND circuit 85, designated as Z, assumes the binary 1 level if all 8 bytes (all 64 bits) in the output field of arithmetic unit 20 have a value of 0.

As indicated in FIG. 6, the size exception detector 14 also includes a binary sign bit selector 90. This binary sign bit selector 90 is coupled to the output of the arithmetic unit 20 by way of the bus 13 and is responsive to the lower order destination length bits 1, 2 and 3 for selecting the binary sign bit location in the arithmetic unit output field and for producing a polarity indication indicating whether the destination data, when in binary format, has a positive or a negative sign.

Figure 11:
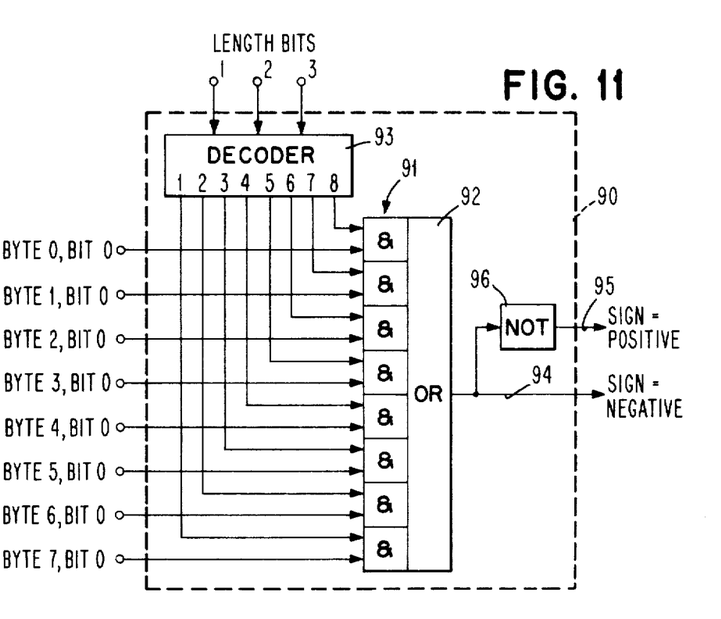
FIG. 11 is a logic circuit diagram showing a representative form of internal construction for the binary sign bit selector of FIG. 6.

A representative form of internal construction for the binary sign bit selector 90 is shown in FIG. 11. As there indicated, only the highest order or most significant bit (Bit 0) of each of the 8 bytes of the arithmetic unit output field is supplied to the sign bit selector 90. This is because, as indicated in FIG. 4, the sign bit S is located in the Bit 0 position of the highest order byte in the actual result data. Which byte is the highest order result byte is determined from the length bits 1, 2 and 3.

As indicated in FIG. 11, the Bit 0 bits for each arithmetic unit output byte are individually supplied to different ones of a set of AND circuits 91. The outputs of AND circuits 91 are connected to the inputs of an OR circuit 92. The length bits 1, 2 and 3 are supplied to a decoder 93 having eight control lines which individually run to different ones of the eight AND circuits 91.

The decoder 93 energizes only that particular output line which corresponds to the destination length value represented by the coding of length bits 1, 2 and 3. This coding is indicated by the upper left-hand part of the chart shown in FIG. 9. Thus, if the length bit coding is 100, output line 5 is energized to activate the AND circuit for Bit 0 of Byte 3. As indicated by example 28 of FIG. 4, this is the correct result for this particular case.

As previously mentioned, the sign bit S has a binary 0 value if the sign is positive and a binary 1 value if the sign is negative. Thus, the occurrence of a binary one level on the OR circuit output line 94 indicates a negative sign. Conversely, a binary 1 level on output line 95 indicates a positive sign, the necessary inverting action being provided by a NOT circuit 96.

Figure 12:
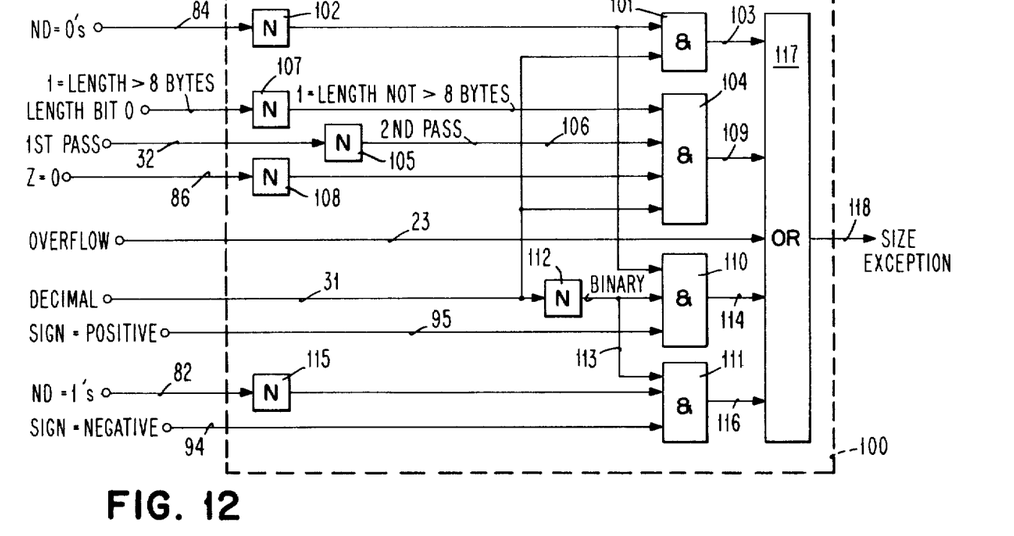
FIG. 12 is a logic circuit diagram showing a representative form of internal construction for the data format logic unit of FIG. 6.

Returning for the moment to FIG. 6, the size exception detector 14 further includes data format logic 100 which is responsive to the various status signals generated by the nondestination status generators 80, the all-byte status generator 85 and the binary sign bit selector 90 for producing the proper size exception signal (SE) for the particular data format being handled by the arithmetic unit 20. A representative form of internal construction for the data format logic 100 is shown in FIG. 12. This data format logic 100 includes two principal parts, namely, decimal format size exception circuitry for generating the size exception signal when the arithmetic unit is processing decimal operands and binary format size exception circuitry for generating the size exception signal when the arithmetic unit is processing binary operands.

With reference to FIG. 12, the decimal format size exception circuitry includes an AND circuit 101 which is enabled when the arithmetic unit 20 is processing decimal data by the decimal format control signal on control line 31. This AND circuit 101 receives an inverted replica of the zero-indicating nondestination (ND) status signal produced by nondestination status generator 80, the signal inversion being provided by a NOT circuit 102. Thus, when processing decimal operands in either zoned or packed format, the output line 103 of AND circuit 101 will assume the binary 1 level when the part of the arithmetic unit output field located outside of the destination length is not entirely zero. Such nonzero condition indicates the presence of significant data and the resulting one level on output line 103 indicates the occurrence of a size exception.

A further AND circuit 104 is also used during decimal operations. It is activated by both the decimal format control signal on control line 31 and an inverted replica of the first pass control signal on control line 32. The first pass control signal on control line 32 is inverted by a NOT circuit 105 to produce on line 106 a binary 1 level when the arithmetic unit is performing a second pass (not first pass) operation. One further condition is needed to enable or activate the AND circuit 104. This further condition is that the destination length for the operands being processed is not greater than 8 bytes. The activating signal for this condition is obtained from a NOT circuit 107 which receives the most significant length bit, namely, length bit 0. In addition to these three control signals, the AND circuit 104 receives an inverted replica of the zero-indicating all-byte status signal Z produced by the all-byte status generator 85, the inverting action being provided by a NOT circuit 108. Thus, when the destination length is not greater than eight bytes (the width of the arithmetic unit) and the arithmetic unit 20 is doing a second pass operation, the AND circuit 104 will produce a binary 1 level on its output line 109 if the entire output field of the arithmetic unit 20 is not all zeros.

This one level on output line 109 represents a size exception because if the destination length is less than the arithmetic unit width, there should not be any significant data (nonzero bits) when making a second pass operation for this same less-than-8-byte destination. Among other things, the checking mechanism provided by AND circuit 104 checks the status of the Byte 7 bits during a second pass operation. As previously indicated in connection with FIG. 8, the Byte 7 bits are ignored by the signal selectors 44 and the nondestination status generators 80. Thus, AND circuit 104 takes them into account when such is needed, namely, during a second pass operation.

As indicated, the data format logic 100 also includes binary format size exception circuitry for use when the arithmetic unit 20 is processing data in pure binary format. This circuitry includes a pair of AND circuits 110 and 111. When processing data in binary format, the decimal format control signal on line 31 is at the binary 0 level. This is inverted by a NOT circuit 112 to produce a binary 1 level on line 113. This one level, in turn, activates or enables the binary format AND gates 110 and 111. At the same time, the zero level on control line 31 disables the decimal format AND circuits 101 and 104.

The proper nondestination status condition for binary format data is dependent on the sign of the data. If the sign is positive (S=0), then the nondestination bits should be all zeros. If, on the other hand, the sign is negative (S=1), then all nondestination bits should have a value of 1.

The positive sign case is handled by the AND circuit 110. In particular, this AND circuit 110 is activated by a positive sign indication received from the sign bit selector 90 on line 95 to enable it to examine the inverted zero-indicating nondestination signal at the output of NOT circuit 102. Thus, if the sign is positive and the non-destination bits are not all zeros, then AND circuit 110 produces a one level size exception indication on its output line 114.

The negative sign binary case is handled by the AND circuit 111. This AND circuit 111 is activated or enabled by a negative sign indication received from sign bit selector 90 on line 94 to cause it to examine the status of the inverted one-indicating nondestination signal appearing at the output of a NOT circuit 115. Thus, if the sign is negative and the nondestination bits are not all ones, then the AND circuit 111 produces a size exception indicating one level on its output line 116.

In the present embodiment, it is assumed that the arithmetic unit 20 is never required to make a second pass when handling data in a pure binary format. In other words, it is assumed that binary data never exceeds eight bytes (64 bits) in length. Deducting one for the sign bit, this enables representation of a decimal value of $2^{63}$ which is a decimal number somewhat in excess of $9 \times 10^{18}$, which should be adequate for most purposes. If desired, however, the present embodiment can be readily modified to accommodate binary format operands which require a second pass.

The outputs of the various AND circuits 101, 104, 110 and 111 are connected to an OR circuit 117 to produce on a common output line 118 a one-level size exception (SE) signal whenever any one of the different size exception conditions exists.

The overflow signal line 23 of the arithmetic unit 20 is also connected to a further input of the OR circuit 117. This is the normal sort of adder overflow signal and is, for convenience, combined with the size exception signal to provide a singular exception signal which covers both the case of an oversized result and the case of a normal adder overflow. This overflow signal has the same indication as the carry-out line 17 when doing a decimal operation. When doing a binary operation, this line indicates that there is a difference between the carry into and the carry out of Byte 0 Bit 0 of the arithmetic unit 20.

As indicated in FIG. 6, the size exception (SE) signal produced by the data format logic 100 is supplied to first pass/second logic 120. This first pass/second pass logic 120 takes into account certain factors which need to be considered when performing arithmetic operations which may require a second pass through the arithmetic unit for the same pair of source operands. A representative form of internal construction for the first pass/second pass logic 120 is shown in FIG. 13.

Figure 13:
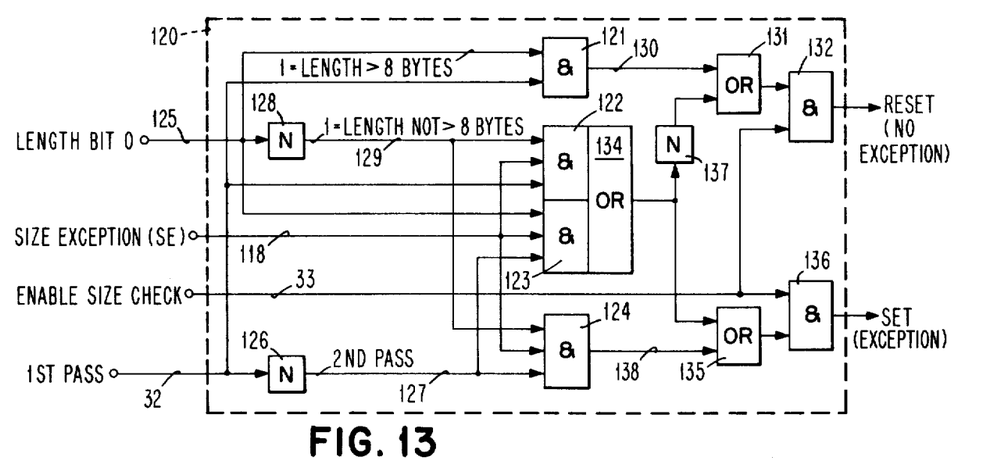
FIG. 13 is a logic circuit diagram showing a representative form of internal construction for the first-pass-/second-pass logic unit of FIG. 6.

As seen in FIG. 13, this representative form of construction includes a set of four AND circuits 121, 122, 123 and 124. AND circuit 121 handles the case of a first pass operation where the destination length is greater than the arithmetic unit width (8 bytes). AND circuit 122 handles the case of a first pass operation where the destination length is equal to or less than the arithmetic unit width (8 bytes). AND circuit 123 handles the case of a second pass operation where the destination length is greater than the arithmetic unit width (8 bytes). AND circuit 124 handles the case of a second pass operation where the destination length is equal to or less than the arithmetic unit width (8 bytes). The selection of proper AND circuit is determined by the status of the first pass control signal on control line 32 and the status of the high order length bit (length bit 0) signal on line 125. The signal level on first pass control line 32 is inverted by a NOT circuit 126 to produce on a line 127 a second pass signal when the signal level on line 32 is at the non-first pass zero level. In a similar manner, the signal level on high order length bit line 125 is inverted by a NOT circuit 128 to produce on a line 129 a binary 1 level when the length bit line 125 is at the zero level or, in other words, when the destination length is not greater than 8 bytes.

During a first pass operation, the one level on control line 32 enables AND circuits 121 and 122 and the concurrent zero level on line 127 disables the other two AND circuits 123 and 124. During a second pass operation, the situation is reversed, with the latter AND circuits 123 and 124 being enabled and the former AND circuits 121 and 122 being disabled. With respect to the high order length bit line 125, a one level thereon (length greater than 8 bytes) activates the first and third AND circuits 121 and 123 and the concurrent zero level on line 129 disables the second and fourth AND circuits 122 and 124. If the length is not greater than 8 bytes, the situation is reversed.

Any size exception signal coming in on line 118 is supplied to the second, third and fourth AND circuits 122, 123 and 124, but not to the first AND circuit 121.

If the destination length is greater than 8 bytes and the arithmetic unit 20 is performing a first pass operation, then only the AND circuit 121 is activated and this is done regardless of the status of the size exception signal on line 118. This produces a binary 1 level on AND circuit output line 130 which is supplied by way of OR circuit 131 and AND circuit 132 (assumed to be enabled) to the status latch 15 to reset same. This reset represents a no exception condition. Thus, if the destination length is greater than 8 bytes, the status latch 15 is always reset on the first pass. This, in effect, means that any size exception generated during such a first pass is ignored by the status latch 15. This is the proper result since, in this instance, it is too early to tell whether any data will be lost.

If the destination length is equal to or less than 8 bytes, then the second AND circuit 122 will be active on a first pass operation to reproduce on its output line the same signal level as appears on the size exception input line 118. If there is a size exception condition, then the output of AND circuit 122 is at the binary 1 level and this one level is supplied by way of OR circuit 134, OR circuit 135 and AND circuit 136 (assumed to be enabled) to the set input line for the status latch 15. This sets the status latch 15 to the set condition, which condition indicates the occurrence of a size exception. If no size exception indicating one level is present on the size exception input line 118, then the output of AND circuit 122 remains at the zero level. The resulting zero level at the output of OR circuit 134 is inverted by a NOT circuit 137 to produce by way of OR circuit 131 and AND circuit 132 a latch resetting one level on the status latch reset line.

If the destination width is greater than 8 bytes and a second pass operation is being performed by the arithmetic unit 20, then the third AND circuit 123 is activated to produce the same kind of operation for the second pass that the second AND circuit 122 produced for the first pass. In other words, an exception indicating one level on the size exception input line 118 will set the status latch 15 and a no exception indicating zero level will reset the status latch 15.

If the destination length is less than or equal to 8 bytes and the arithmetic unit 20 is performing a second pass operation, then the fourth AND circuit 124 is activated to produce on its output line the same signal level as is present on the size exception input line 118. This signal on AND circuit output line 138 is, however, only operative to affect the set line for the status latch 15. If size exception line 118 is at the one level, then the one level on output line 138 operates by way of OR circuit 135 and AND circuit 136 to set the status latch 15. If, however, the size exception line 118 is at the the zero level (no size exception found during this second pass), then the output of the fourth AND circuit 124 has no effect on the status latch 15. This is important because to reset the status latch in this instance would, in effect, erase any size exception that was recorded therein during the first pass for this same set of operands.

Up to this point, the two output AND circuits 132 and 136 were assumed to be in their active or enabled conditions. Actually, they are controlled by the Enable Size Check signal on control line 33, which signal is in the nature of a timing signal, to enable the set or reset signal, as the case may be, to be transferred to the status latch 15 at the appropriate point in time. The timing for this Enable Size Check signal is such that the output AND circuits 132 and 136 are briefly activated near the end of each machine control cycle during which the arithmetic unit 20 performs an arithmetic operation. This prevents any spurious signals occurring during the early part of the arithmetic operation cycle from affecting the status latch 15. It also prevents any spurious signals produced when the arithmetic unit is doing something besides an arithmetic operation from affecting the status latch 15. By activating the output AND circuits 132 and 136 near the end of each arithmetic operation machine control cycle, any size exception indication produced at the outputs of AND circuits 122, 123 and 124 is supplied to the status latch 15 during the same machine control cycle during which the arithmetic unit 20 performed the arithmetic operation which gave rise to such size exception.

It is assumed herein that the control section of the processor in which the arithmetic unit 20 is located includes the appropriate mechanism for causing second pass operations for those operands which require same. One way of doing this is to construct the control section so that the processor will automatically perform two arithmetic unit passes any time an arithmetic operation is to be performed with decimal operands in particular and, if desired, binary operands as well. An alternative technique is to provide a mechanism responsive to the higher order bits in the two source operand length fields for causing a second pass any time either source operand has a length greater than the width of the arithmetic unit. In some applications, the first method will be the faster method because no checking of length field bits is required. In any event, one of these methods or its equivalent is provided for insuring that second pass operations are performed when needed.

At various points in this application, reference was made to System/360 and System/370 type data processors. This was done only by way of example and it is to be clearly understood that the present invention is not limited to use in machines of these types. It is further noted that the representative forms of construction for the signal generator circuitry, selector circuitry and logic circuitry described hereinabove were implemented by means of AND, OR and NOT circuits. This was done to simplify the understanding process. It should be clearly understood, however, that such circuitry can also be implemented in whole or in part by means of NAND circuits or NOR circuits or other forms of logic circuits.

While there has been described what is at present considered to be a preferred embodiment of this invention, it will be obvious to those skilled in the art that various changes and modifications may be made herein without departing from the invention, and it is, therefore, intended to cover all such changes and modifications as fall within the true spirit and scope of the invention.

What is claimed is:

1. In a data processing system for storing variable length operands in variable length destinations, wherein the destination length may be less than the length of the operand to be stored, the combination comprising:
   circuitry for providing an indication of the destination length;
   circuitry responsive to the operand to be stored for providing status signals for different parts of the operand field;
   and circuitry responsive to the destination length indication and to the status signals for generating a size exception indication when the part of the operand field located outside of the destination length contains significant data.

2. In a data processing system having an arithmetic unit for performing arithmetic operations on variable length operands and sending the results to variable length destinations, wherein the destination length may be less than the length of at least one of the operands, the combination comprising:
   circuitry for providing an indication of the destination length;
   circuitry coupled to the arithmetic unit for providing status signals for different parts of the arithmetic unit output field;
   and circuitry responsive to the destination length indication and to the status signals for generating a size exception indication when the part of the arithmetic unit output field located outside of the destination length contained significant data.

3. In a data processing system having an arithmetic unit and responsive to data processing instructions for performing arithmetic operations on variable length operands and sending the results to variable length destinations, wherein the operand and destination lengths are specified in the instruction and wherein the destination length may be less than the length of at least one of the operands, the combination comprising:
   circuitry for providing an indication of the destination length specified in the instruction;
   circuitry coupled to the arithmetic unit for providing status signals for different parts of the arithmetic unit output field;
   and circuitry responsive to the destination length indication and to the status signals for generating a size exception indication when the part of the arithmetic unit output field located outside of the destination length contains significant data.

4. The combination of claim 3 wherein the size exception generating circuitry is operative to generate the size exception indication during the same machine control cycle during which the arithmetic unit performs the arithmetic operation which gives rise to the size exception.

5. In a data processing system having a multibyte parallel arithmetic unit and responsive to data processing instructions for performing arithmetic operations on variable length operands and sending the results to variable length destinations, wherein the operand and destination lengths in byte units are specified in the instruction and wherein the destination length may be less than the length of at least one of the operands, the combination comprising:
   circuitry for providing an indication of the byte unit destination length specified in the instruction;
   circuitry coupled to the arithmetic unit for providing status signals for the different bytes of the arithmetic unit output field;
   and circuitry responsive to the destination length indication and to the status signals for generating a size exception indication when the part of the arithmetic unit output field located outside of the destination length contains significant data.

6. The combination of claim 5 wherein the size exception generating circuitry is operative to generate the size exception indication during the same machine control cycle during which the arithmetic unit performs the arithmetic operation which gives rise to the size exception.

7. In a data processing system having a multibyte parallel arithmetic unit and responsive to data processing instructions for performing arithmetic operations on variable length operands and sending the results to variable length destinations, wherein the operand and destination lengths in byte units are specified in the instruction and wherein the destination length may be less than the length of at least one of the operands, the combination comprising:
- circuitry for providing an indication of the byte unit destination length specified in the instruction;
- status signal generating circuitry coupled to the arithmetic unit for producing status signals for the different bytes of the arithmetic unit output field;
- selector circuitry responsive to the destination length indication for selecting the status signals for that part of the arithmetic unit output field which is located outside of the destination length;
- and circuitry responsive to the selected status signals for generating a size exception indication when such selected status signals indicate the presence of significant data.

8. In a data processing system having a multibyte parallel arithmetic unit and responsive to data processing instructions for performing arithmetic operations on variable length binary coded decimal operands in either zoned or packed format and sending the results to variable length destinations, wherein the operand and destination lengths in byte units are specified in the instruction and wherein the destination length may be less than the length of at least one of the operands, the combination comprising:
- circuitry for providing an indication of the byte unit destination length specified in the instruction;
- circuitry coupled to the arithmetic unit for producing a status signal for each 4-bit portion of the arithmetic unit output field for indicating whether or not all the bits in such four-bit portion are zeros and including circuitry responsive to a zoned decimal control signal for forcing the status signals for the four-bit zone field portions to give an all zero indication when the arithmetic unit is processing zoned decimal operands;
- and circuitry responsive to the destination length indication and to the status signals for generating a size exception indication when any of the status signals for the part of the arithmetic unit output field located outside of the destination length indicates the presence of a non-zero bit.

9. In a data processing system having a parallel arithmetic unit and responsive to data processing instructions for performing arithmetic operations on variable length signed binary operands and sending the results to variable length destinations, wherein the operand and destination lengths are specified in the instruction and wherein the destination length may be less than the length of at least one of the operands, the combination comprising:
- circuitry for providing an indication of the destination length specified in the instruction;
- binary sign bit circuitry coupled to the output of the arithmetic unit and responsive to the destination length indication for selecting the sign bit location in the arithmetic unit output field and producing a polarity indication indicating whether the destination data has a positive or a negative sign;
- and size exception circuitry coupled to the output of the arithmetic unit and responsive to the polarity indication and the destination length indication for generating a size exception indication if the polarity indication is positive and the bits of the arithmetic unit output field located outside of the destination length are not all zeros or if the polarity indication is negative and the non-destination bits are not all ones.

10. In a data processing system having a multibyte parallel arithmetic unit and responsive to data processing instructions for performing arithmetic operations on variable length signed binary operands and sending the results to variable length destinations, wherein the operand and destination lengths in byte units are specified in the instruction and wherein the destination length may be less than the length of at least one of the operands, the combination comprising:
- circuitry for providing an indication of the byte unit destination length specified in the instruction;
- status signal generating circuitry coupled to the arithmetic unit for producing first and second status signals for each byte of the arithmetic unit output field, the first status signal being a zero indicating status signal for indicating whether or not all the bits in the byte are zeros and the second status signal being a one indicating status signal for indicating whether or not all the bits in the byte are ones;
- binary sign bit circuitry coupled to the output of the arithmetic unit and responsive to the destination length indication for selecting the sign bit location in the arithmetic unit output field and producing a polarity indication indicating whether the destination data has a positive or a negative sign;
- and size exception circuitry responsive to the zero and one indicating status signals, the polarity indication and the destination length indication for generating a size exception indication if the polarity indication is positive and the bits or the arithmetic unit output field located outside of the destination length are not all zeros or if the polarity indication is negative and the non-destination bits are not all ones.

11. In a data processing system having a multibyte parallel arithmetic unit and responsive to data processing instructions for performing arithmetic operations on variable length operands in either decimal or binary format and sending the results to variable length destinations, wherein the operand and destination lengths in byte units are specified in the instruction and wherein the destination length may be less than the length of at least one of the operands, the combination comprising:
- circuitry for providing an indication of the byte unit destination length specified in the instruction;
- status signal generating circuitry coupled to the arithmetic unit for producing first and second status signals for each byte of the arithmetic unit output field;
- decimal format size exception circuitry responsive to the destination length indication, the first status signals and a decimal format control signal for generating a size exception indication when the arithmetic unit is processing decimal operands and the part of the arithmetic unit output field located outside of the destination length contains significant data;
- and binary format size exception circuitry responsive to the destination length indication, the first and second status signals and a binary format control signal for generating a size exception indication when the arithmetic unit is processing binary operands and the part of the arithmetic unit output field located outside of the destination length contains significant data.

12. In a data processing system having a parallel arithmetic unit of fixed width and responsive to data processing instructions for performing arithmetic operations on variable length operands and sending the results to variable length destinations, wherein the operand and destination lengths are specified by plural-bit length fields in the instruction, the destination length may be less than the length of at least one of the operands and, for those cases where the operand length is greater than the arithmetic unit width, the lower order parts of the operands are processed during a first pass through the arithmetic unit and the higher order parts of the operands are processed during a second pass through the arithmetic unit, the combination comprising:

circuitry for providing indications of the destination length bits in the instruction;

circuitry coupled to the arithmetic unit for providing status signals for different parts of the arithmetic unit output field;

size exception circuitry responsive to the lower order destination length bits and to the status signals for generating a size exception indication when the part of the arithmetic unit output field located outside of the destination length specified by these lower order bits contains significant data;

output circuitry for making the size exception indication available to a control section of the data process system;

and first pass–second pass circuitry located intermediate the size exception circuitry and the output circuitry and responsive to a higher order destination length bit and to a first pass control signal from the control section for inhibiting transfer of the size exception indication to the output circuitry for the case of a first pass with operands of length greater than the arithmetic unit width.

* * * * *